(12) United States Patent
Neuer et al.

(10) Patent No.: US 7,137,661 B2
(45) Date of Patent: Nov. 21, 2006

(54) AUTOMOBILE SUNSHADE

(76) Inventors: Leon Neuer, 42 Atzmauut St., Apt. #21, Petach Tikva 49379 (IL); Uzi Kupfer, 42 Atzmaut St. Apt #5, Petach Tikva 49379 (IL)

(\*) Notice: Subject to any disclaimer, the term of this patent is extended or adjusted under 35 U.S.C. 154(b) by 0 days.

(21) Appl. No.: 11/203,744

(22) Filed: Aug. 15, 2005

(65) Prior Publication Data
US 2006/0055201 A1    Mar. 16, 2006

Related U.S. Application Data

(62) Division of application No. 10/331,325, filed on Dec. 31, 2002, now abandoned.

(51) Int. Cl.
*B60J 7/20* (2006.01)
(52) U.S. Cl. ............... 296/136.01; 296/95.1; 160/370.22
(58) Field of Classification Search ............ 296/136.1, 296/95.1, 136.03, 97.8, 136.02, 141, 98, 296/136.04; 160/302, 370.22
See application file for complete search history.

(56) References Cited

U.S. PATENT DOCUMENTS

| | | | | |
|---|---|---|---|---|
| 1,999,171 A | * | 4/1935 | Bryant | 296/136.03 |
| 3,183,033 A | * | 5/1965 | Stulbach | 296/97.2 |
| 4,131,269 A | * | 12/1978 | Brattrud | 296/95.1 |
| 5,433,499 A | * | 7/1995 | Wu | 296/95.1 |
| 5,468,040 A | * | 11/1995 | Peng Hsieh et al. | 296/97.8 |
| 5,516,181 A | * | 5/1996 | Thompson | 296/136.01 |
| 5,762,393 A | * | 6/1998 | Darmas, Sr. | 296/136.01 |
| 6,012,759 A | * | 1/2000 | Adamek | 296/136.03 |
| 6,059,010 A | * | 5/2000 | Yang | 160/370.22 |
| 6,206,451 B1 | * | 3/2001 | Maano | 296/136.04 |
| 6,276,742 B1 | * | 8/2001 | Deng et al. | 296/95.1 |
| 6,513,858 B1 | * | 2/2003 | Li et al. | 296/98 |
| 6,662,849 B1 | * | 12/2003 | Hsiung | 160/370.22 |
| 6,672,643 B1 | * | 1/2004 | Brodskiy et al. | 296/136.01 |
| 6,908,138 B1 | * | 6/2005 | Yang | 296/95.1 |
| 6,997,497 B1 | * | 2/2006 | Sagi et al. | 296/37.7 |
| 2002/0092630 A1 | * | 7/2002 | Kremer et al. | 160/370.22 |
| 2004/0135393 A1 | * | 7/2004 | Neuer et al. | 296/136.1 |

\* cited by examiner

*Primary Examiner*—Kiran B. Patel
(74) *Attorney, Agent, or Firm*—Bernard Malina; Malina & Associates, P.C.

(57) ABSTRACT

A sunshade for use with an automobile includes a plurality of housings which can be mounted on the roof of the automobile. Each of the housings contains a flexible sunshade which is mounted on a roller. The sunshades can be unrolled to protect the front windshield, the side windows, the rear window and the roof of the automobile. Magnets are provided on the outer edges of the sunshades for attachment to the body of the automobile.

5 Claims, 24 Drawing Sheets

AUTOMOBILE SUNSHADE

This is a divisional application of Ser. No. 10/331,325, filed Dec. 31, 2002 now abandoned.

FIELD OF THE INVENTION

The present invention relates generally to the field of equipment for automobiles and more particularly to an automobile sunshade.

BACKGROUND OF THE INVENTION

As a result of the well-known greenhouse effect, automobiles which are subjected to periods of exposure to sunshine experience significant heating of the automobile's interior. This effect is especially troublesome in relatively warm climates where the heating of the interior results in heating of the steering wheel, dashboard, and other controls to levels which are too hot to be operated safely. Automobile owners typically must operate the air conditioning until the interior of the automobile returns to comfortable and safe levels before operating the automobile. This process is both time consuming and wasteful. In addition, the heating of the automobile interior leads to the damage of heat sensitive material such as food, photographic film and electronic equipment.

Attempts to solve this problem by using sunshades mounted inside the automobile result is only limited success. These interior mounted sunshades result in heating of the windshield and also must be folded and stored in the automobile trunk after use.

Attempts to provide sunshades which are mounted on the outside of the automobile have resulted in the devices shown in the following U.S. Patents.

U.S. Pat. No. 5,690,376 to Leidal shows a shade cover for an automobile which includes a plurality of rigid panels which are unfolded to form a cover. The cover projects beyond the dimensions of the roof of the automobile. When not in use, the sunshade is folded into a package which approximates the dimensions of the automobile roof, U.S. Pat. No. 6,168,225 to Deng, et al. shows a device for covering windshields which includes a canopy which is movable between a retracted position and an extended position. The canopy includes a rigid main canopy member and a pair of rigid pivoting side canopy members which can pivot inwardly and outwardly and include rollers which ride in tracks formed in housings which are mounted on an automobile; and U.S. Pat. No. 6,276,742 to Deng, et al. shows a screen member and an activator which drives the screen member from a retracted position which is aligned with a housing on the roof of an automobile to an extended position which is aligned with the windshield. The canopy is a rigid member which is intended to prevent snow and ice from building up on the windshield.

Despite the developments of the prior art there remains a need for an automobile sunshade which can provide effective protection of an automobile against solar heating without resorting to complex and costly devices.

OBJECTIVES AND SUMMARY OF THE INVENTION

It is an object of the present invention to provide an automobile sunshade which is mounted on the outside of the automobile.

Another object of the present invention is to provide an automobile sunshade which prevents the greenhouse effect which normally occurs when an automobile is exposed to sunshine for prolonged periods of time.

Another object of the present invention is to provide an automobile sunshade which provides protection for the front, side and rear windows.

Another object of the present invention is to provide an automobile sunshade which provides protection for the roof of an automobile.

Another object of the present invention is to provide an automobile sunshade which can be easily mounted on the roof of an automobile.

Another object of the present invention is to provide an automobile sunshade which can function as a luggage carrier.

Yet another object of the present invention is to provide an automobile sunshade which comprises a relatively small number of component parts which can be manufactured economically, in volume, resulting in a relatively low overall cost.

The foregoing and other objects and advantages of the invention will appear more clearly hereinafter.

In accordance with the present invention, there is provided an automobile sunshade which includes a plurality of housings each of which can be mounted on the roof of an automobile. Each of the housings contains a flexible sunshade which is mounted on a roller. Housings are provided containing sunshades for the protection of the front windshield, the side windows, the rear window and the roof of the automobile. The outer edges of each of the sunshades are attached to magnets which are used to attach the outer edges of the sunshades to the automobile surface when the sunshades are deployed.

BRIEF DESCRIPTION OF THE DRAWINGS

Other important objects and advantages of the invention will be apparent from the following detailed description of the invention taken in connection with the accompanying drawings in which.

DETAILED DESCRIPTION OF THE INVENTION

Figure 1:
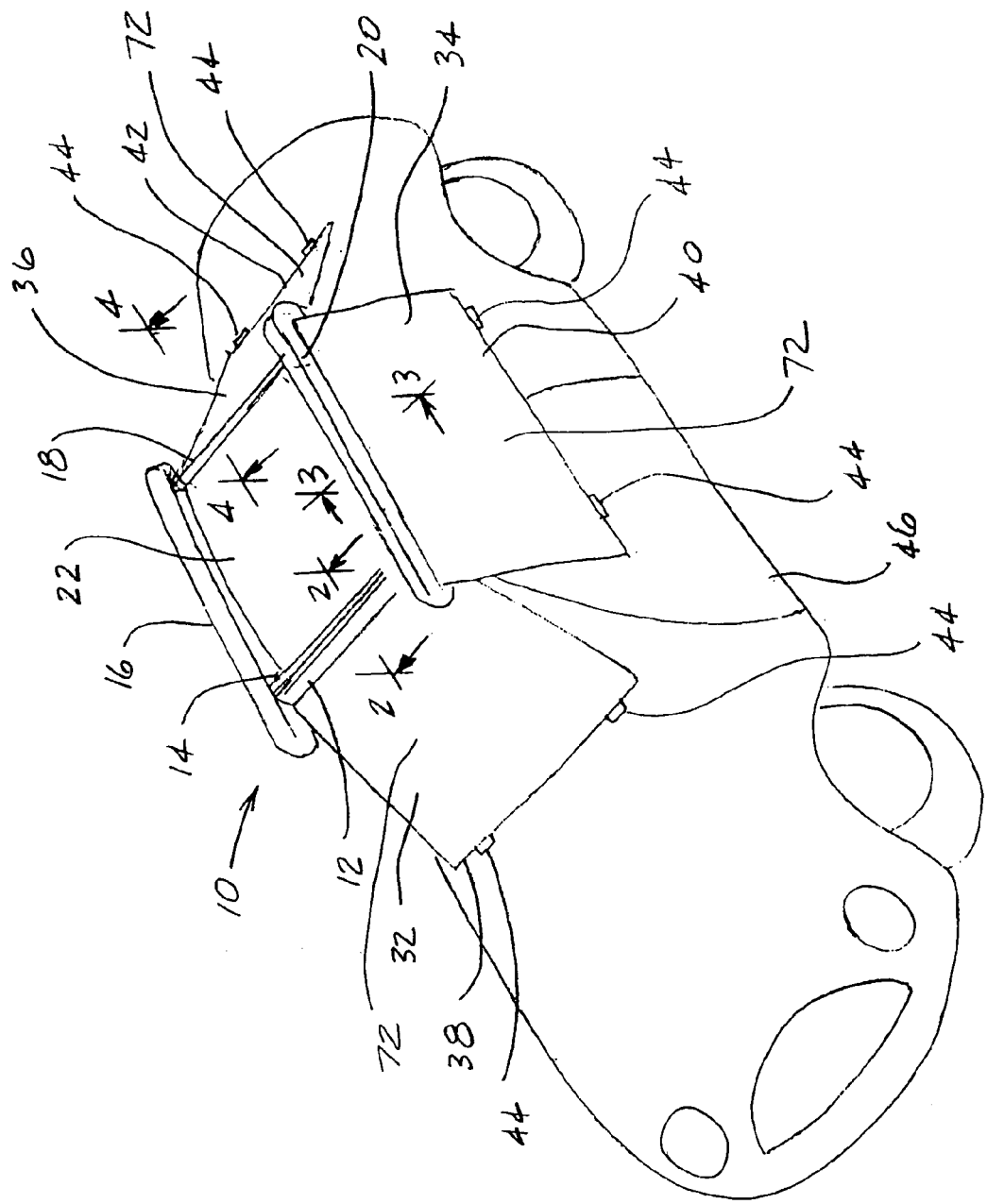
FIG. 1 shows a sunshade for an automobile made according to the present invention with the unit shown mounted on the roof of an automobile.

With reference to the drawings, in which like reference numbers designate like or corresponding parts throughout, there is shown in FIG. 1 an automobile sunshade generally designated by reference number 10, made in accordance with the present invention.

Figure 17:
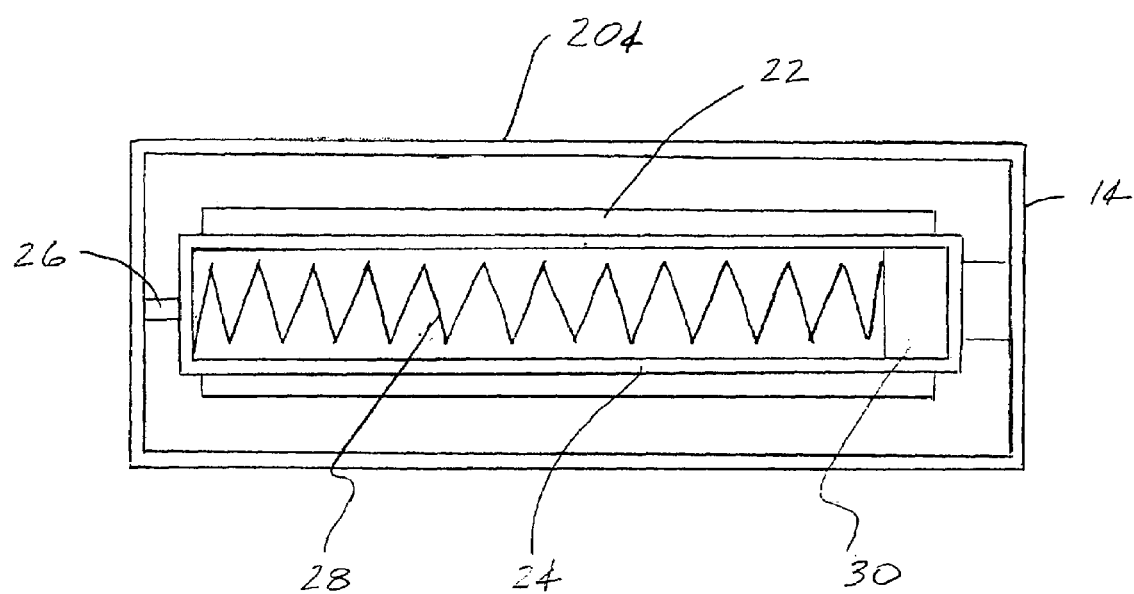
FIG. 17 is a schematic cross-section view taken along the line 17—17 of FIG. 16.

As shown in FIGS. 1–4 and 17 in the first embodiment of the automobile sunshade the apparatus 10 includes five individual housings 12, 14, 16, 18, 20 each of which encloses a flexible sunshade 22, 32, 34, 36 which is mounted on a roller 24 as is shown in FIG. 17. As is shown schematically in FIG. 17, the roller 24 is rotatably mounted in the housing 14 via a pivot 26. The roller 24 is hollow and includes a torsion spring 28 and a pawl assembly 30. The torsion spring 28 and the pawl assembly 30 enable the sunshade 22 to be unrolled thereby twisting and energizing the torsion spring 28. The pawl assembly 30 locks the sunshade 22 in the open position until the sunshade 22 is pulled thereby releasing the roller 24 and allowing the torsion spring 28 to rewind the sunshade 22 onto the roller 24. The details of construction of the roller 24, the torsion spring 28 and the pawl assembly 30 are conventional in nature and have therefore not been illustrated in detail.

As shown in FIG. 1, the sunshades 22, 32, 34, 36 are each generally rectangular and the outer edges 38, 40, 42 of the sunshades 22, 32, 34, 36 each include a plurality of magnets 44 for the purpose of temporary attachment to the automobile 46 without damage or marring of the automobile's surface finish.

As shown in FIG. 1, and as previously described, each of the housings 12, 14, 16, 18, 20 encloses a sunshade 22, 32, 34, 36 which in the stored position is rolled on to the roller 24. When deployed for the protection of the automobile 46, the sunshade 32 in the front housing 12 covers the front windshield, the sunshades 34 in the side housings 16, 20 cover the side windows, the sunshade 36 in the rear housing 18 covers the rear window and the sunshade 22 in the top housing 14 covers the roof of the automobile 46. The housing 16 contains a sunshade (not illustrated) which is similar to the sunshade 34.

Figure 2:
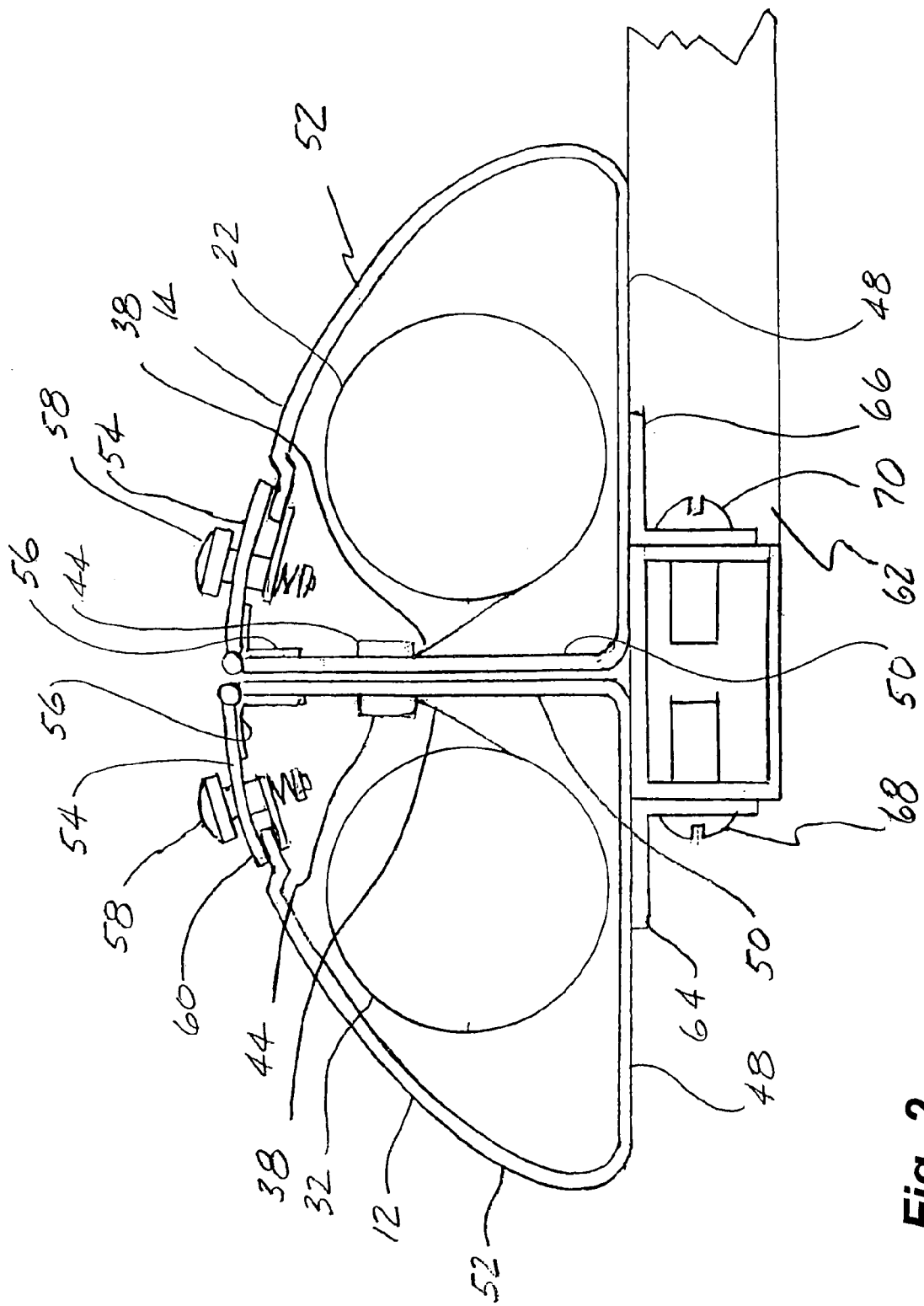
FIG. 2 is a cross-sectional view taken along the line 2—2 of FIG. 1.
Figure 3:
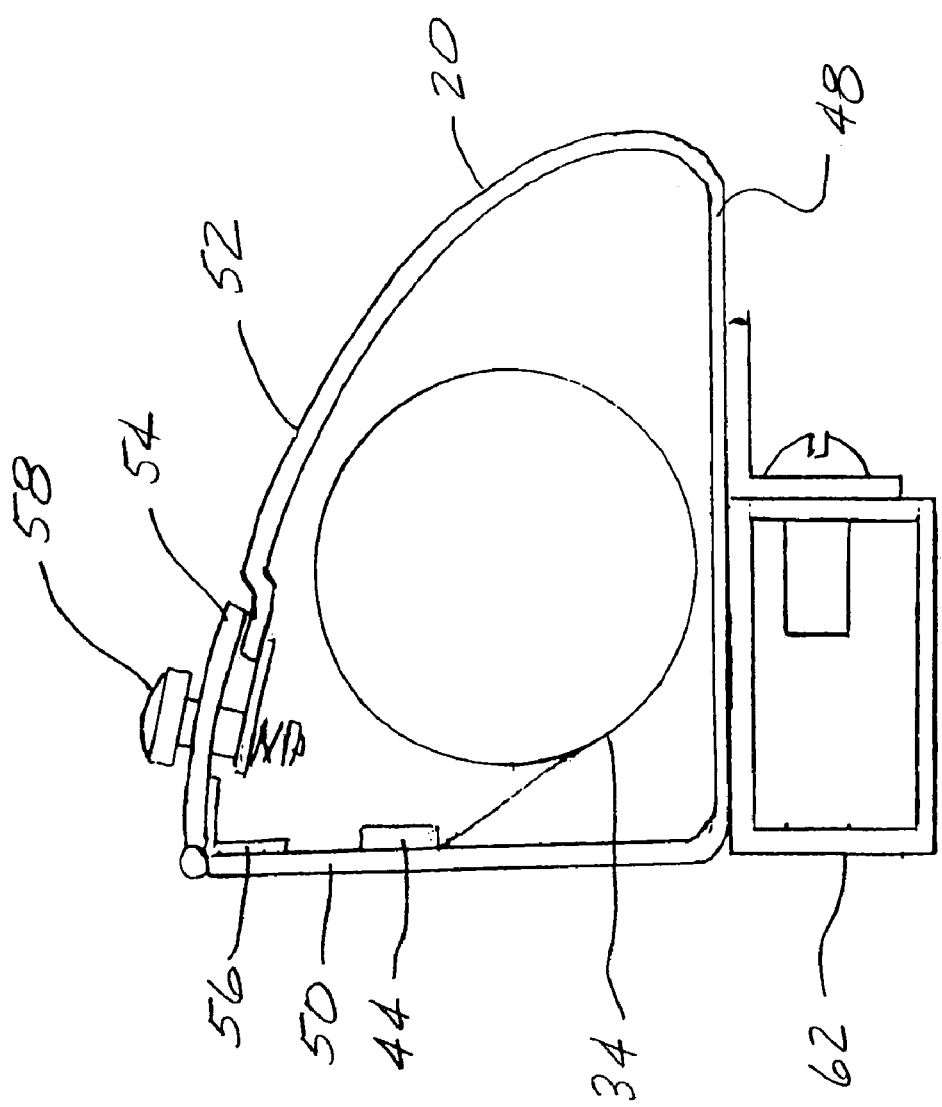
FIG. 3 is a cross-sectional view taken along the line 3—3 of FIG. 1.
Figure 4:
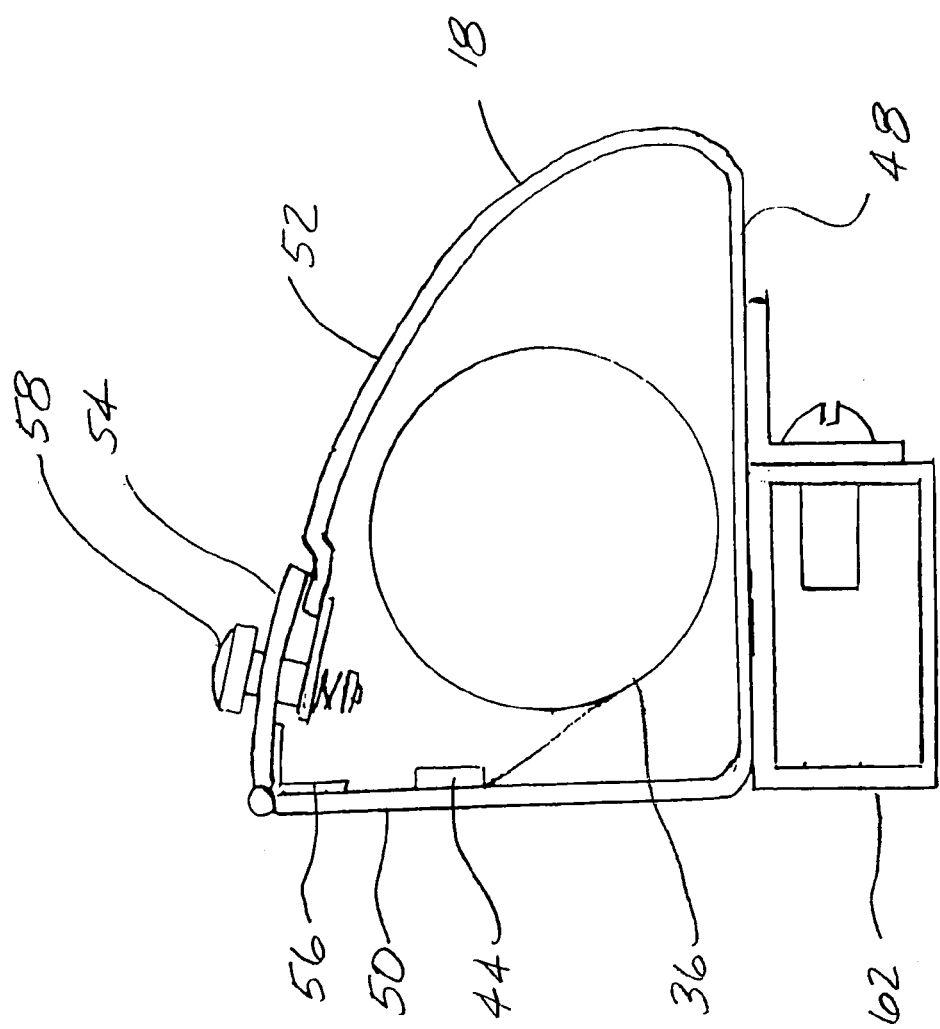
FIG. 4 is a cross-sectional view taken along the line 4—4 of FIG. 1.

As shown in FIGS. 2–4, the housings 12, 14, 16, 18, 20 each include a relatively flat horizontal panel 48, a relatively flat vertical panel 50 and a curved panel 52. The curved panel 52 includes a cover 54 which is attached to the vertical panel 50 by a hinge 56. A spring loaded latch 58 secures the edge 60 of the cover 54. The curved panel 52 and the cover 54 are configured to provide a smooth, streamlined surface which minimizes the wind resistance of the apparatus 10.

The horizontal panels 48 by way of example may be attached to a support frame 62 using angle brackets 64, 66 and bolts 68, 70. The support frame 62 may be part of a luggage carrier which is part of the automobile 46 either as original equipment or as aftermarket equipment. Alternatively, the support frame 62 may be furnished as part of the apparatus 10 of the present invention. The support frame 62 may be attached to the automobile 46 using conventional pads and straps which have not been illustrated.

As shown in FIG. 2, the magnets 44 are attracted to the vertical panels 50 and thus hold the front edges 38 of the sunshades 22, 32 in a secure manner.

During use, the covers 54 are opened and the sunshades 22, 32 are unrolled as shown in FIG. 1.

The outer surfaces 72 of the sunshades 22, 32, 34, 36 may be coated with a reflective material.

Figure 5:
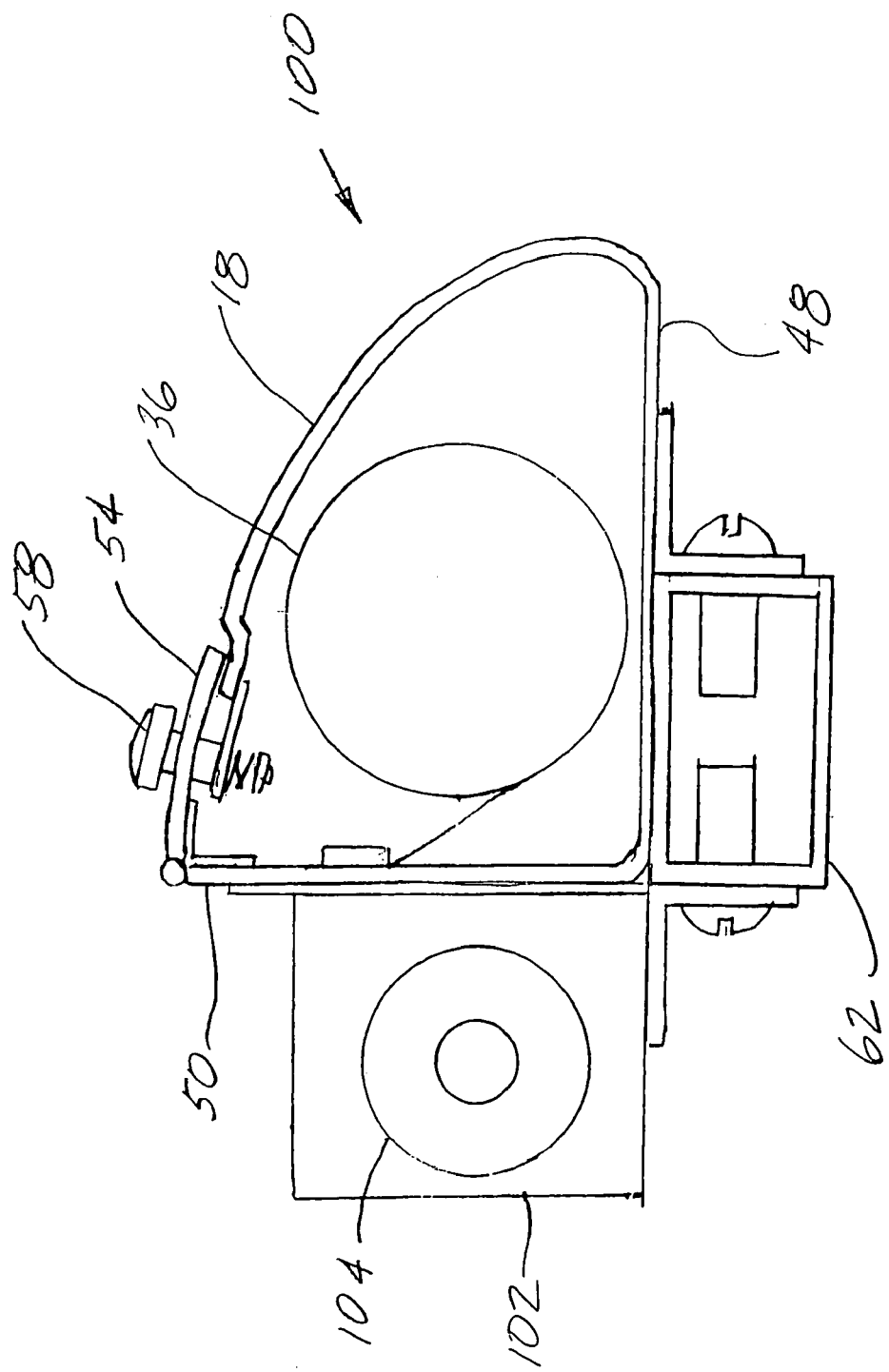
FIG. 5 is a cross-sectional view, similar to FIG. 4 showing a first alternative embodiment of the invention which incorporates an electric motor.
Figure 6:
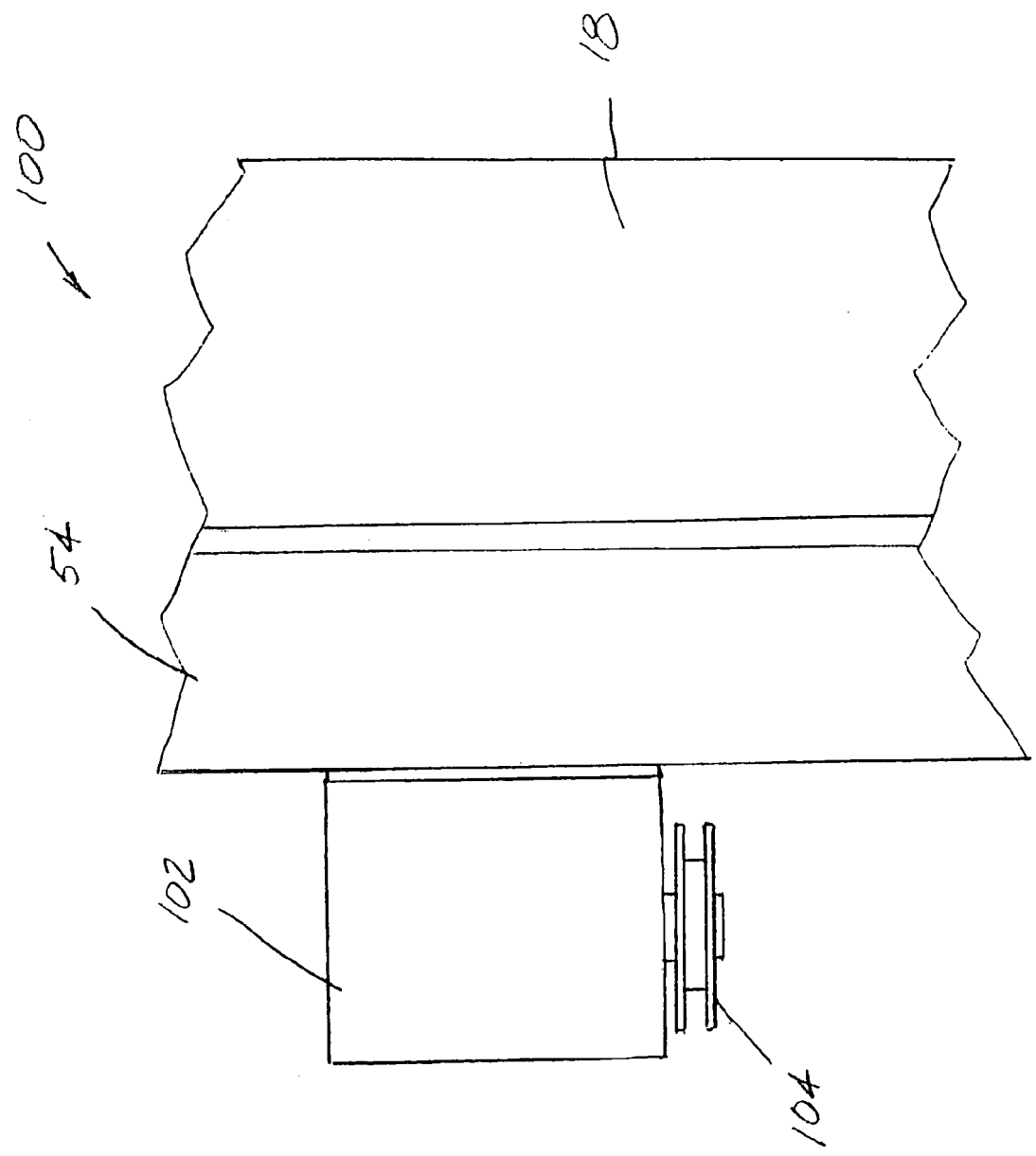
FIG. 6 is a fragmentary top plan view showing the embodiment of FIG. 5.
Figure 7:
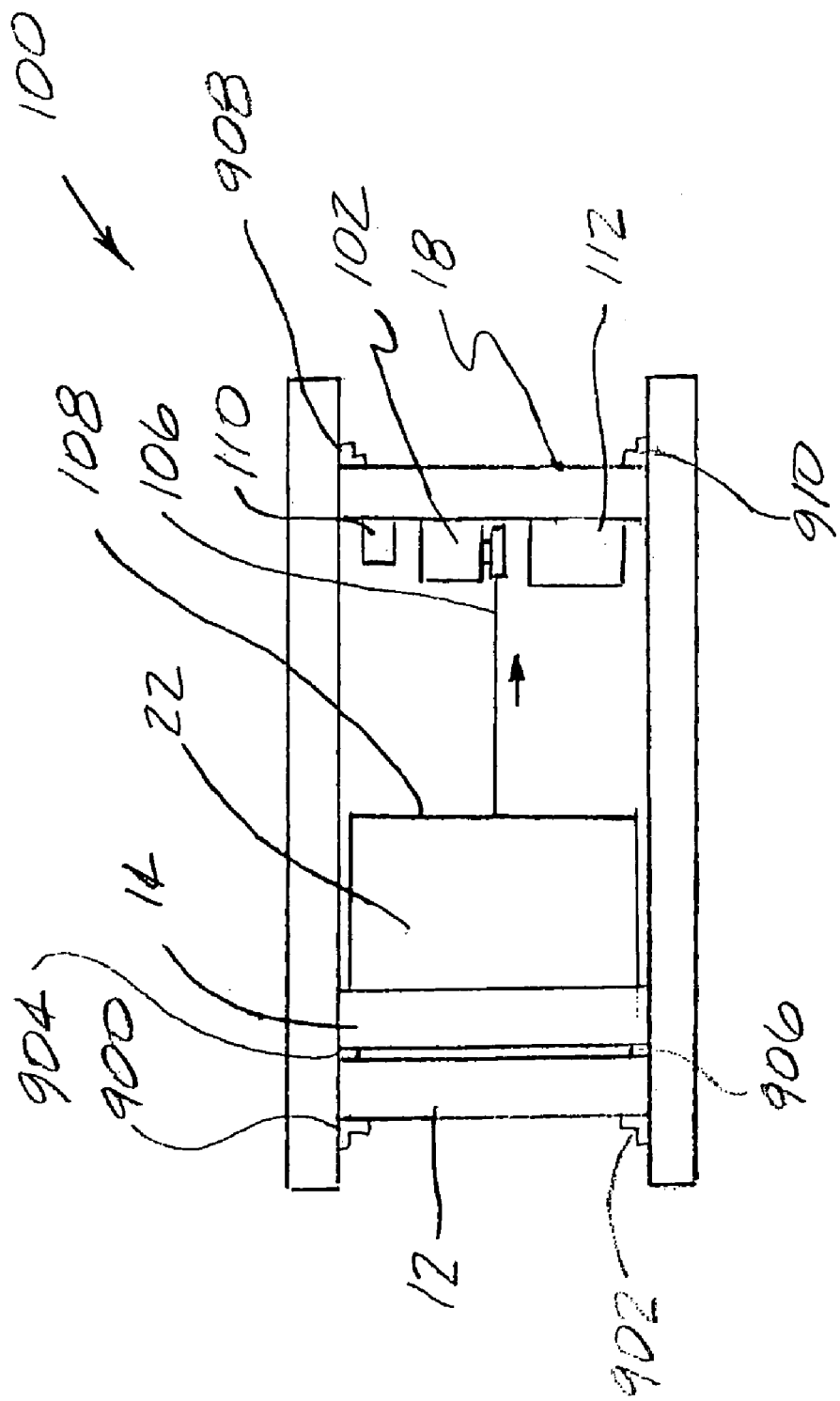
FIG. 7 is a schematic top view showing the operation of the embodiment of FIG. 5 in extending the sunshade which covers the roof of the automobile.

FIGS. 5–7 show a second embodiment of the invention 100 in which an electric motor 102 is mounted on the housing 18 which contains the sunshade 36 for the rear window. As is best shown in FIGS. 6 and 7, the electric motor 102 drives a drum 104 which stores a cord 106. The cord 106 is connected to the edge 108 of the roof sunshade 22.

The motor 102 may be powered by the electrical system of the automobile or, alternatively, by batteries 110. The batteries 110 may be rechargeable batteries which may be powered by a solar panel 112 as shown in FIG. 7.

Figure 8:
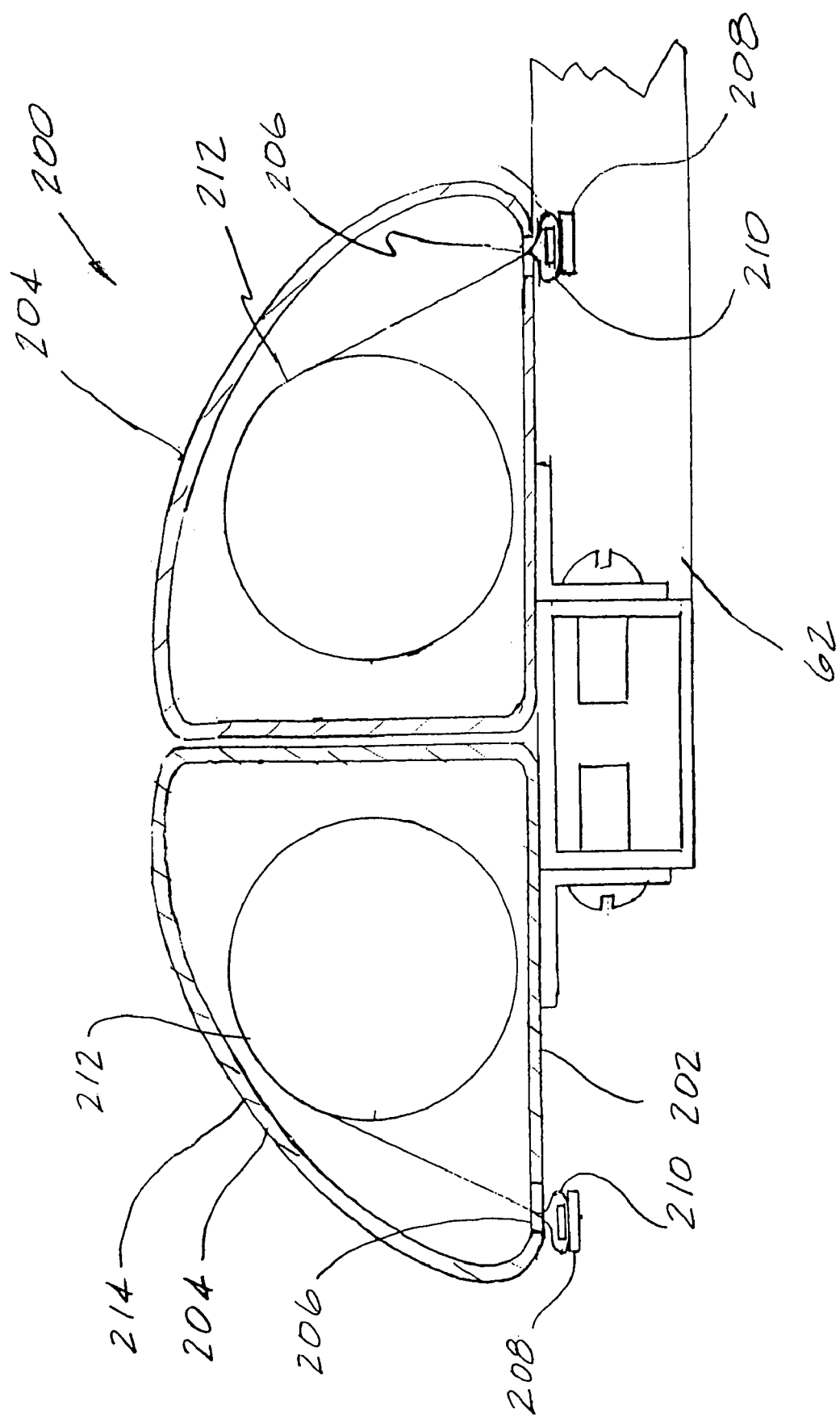
FIG. 8 is a cross-sectional view similar to FIG. 2 showing a third embodiment of the invention, which incorporates a slot formed in the housing.
Figure 9:
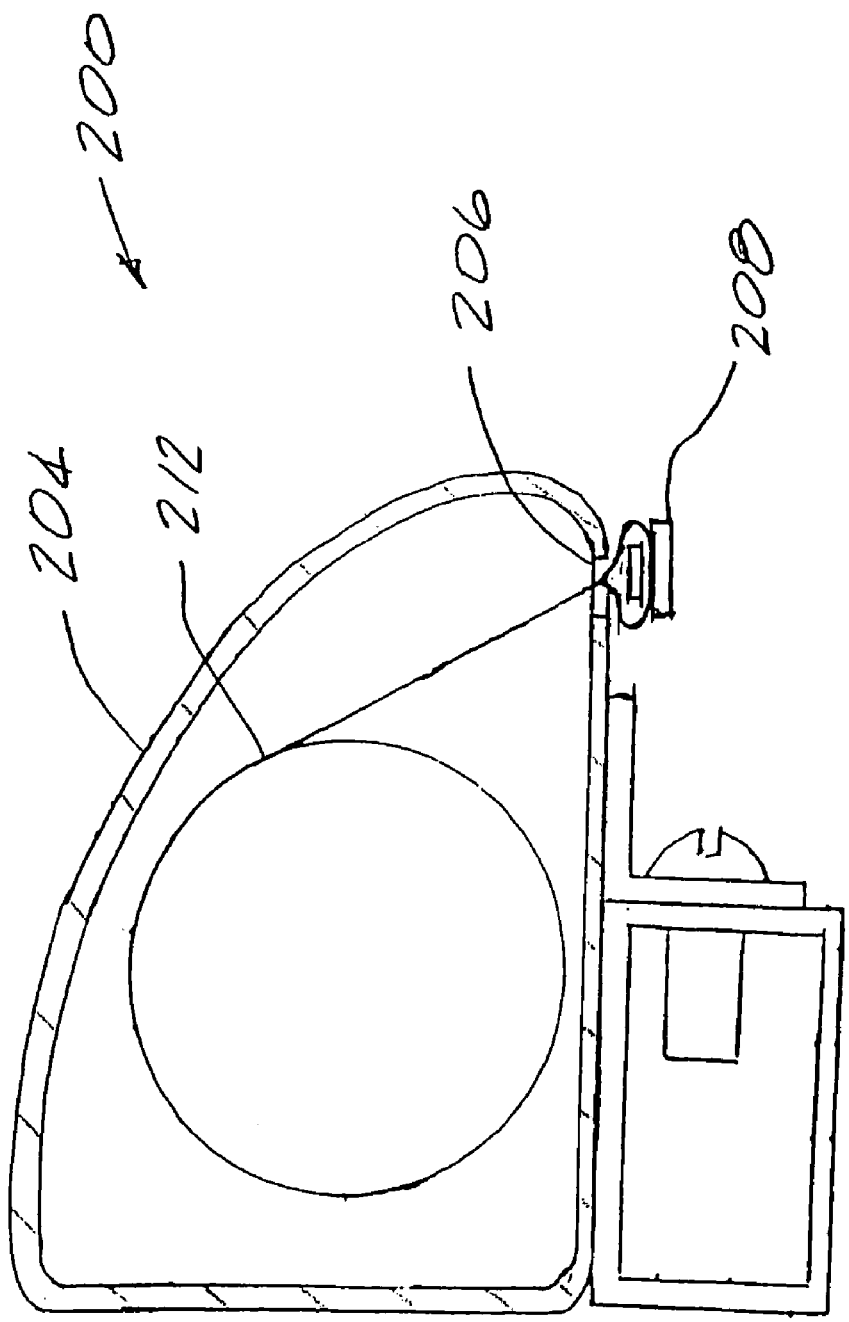
FIG. 9 is a cross-sectional view, similar to FIG. 3, showing the third embodiment of the invention.
Figure 10:
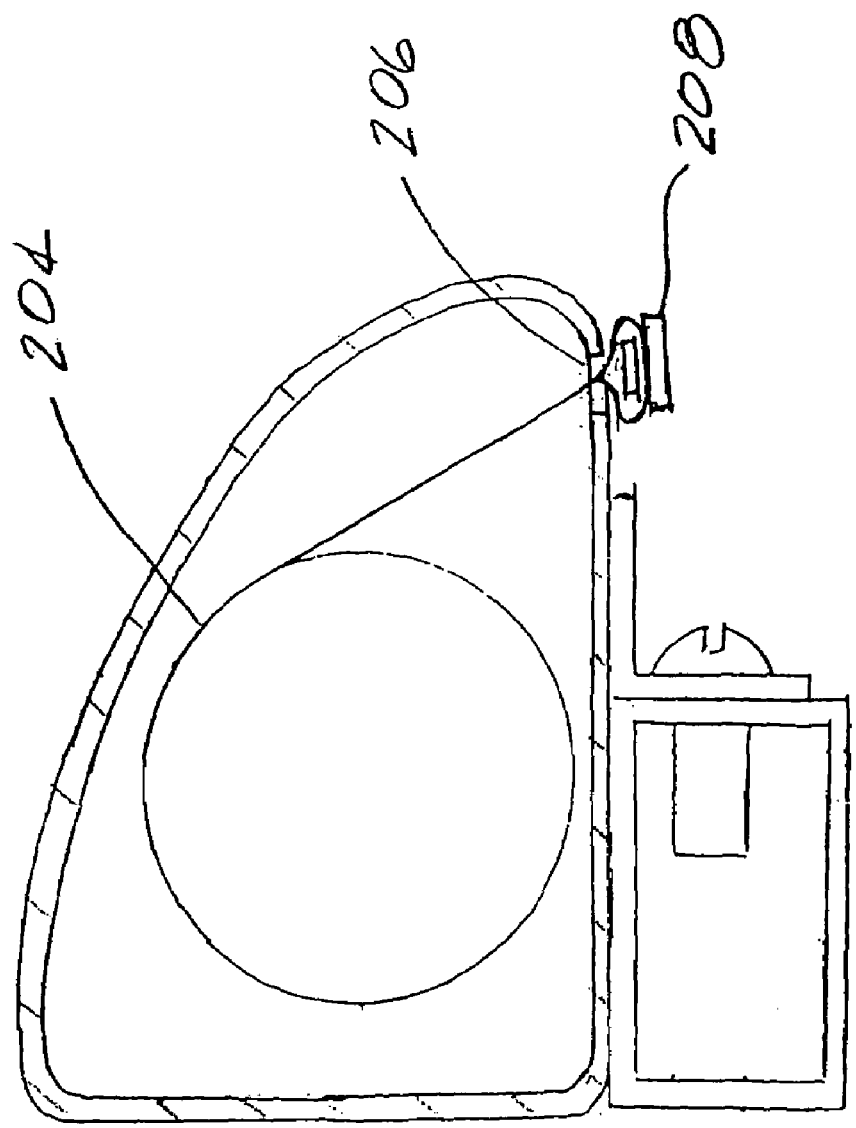
FIG. 10 is a cross-sectional view, similar to FIG. 4, showing the third embodiment of the invention.

FIGS. 8–10 show a third alternative embodiment of the invention 200 in which the cover 54 has been eliminated. As is shown in FIG. 8, the horizontal panel 202 of the housing 204 has a relatively narrow slot 206 which accepts the sunshade 212. When in the stored configuration the magnets 208 at the edge 210 of the sunshade 212 are attracted to the horizontal panel 202 of the housing 204. The elimination of the cover 54 allows the housing 204 to present an extremely smooth unbroken curved surface 214 resulting in minimum wind resistance.

Figure 11:
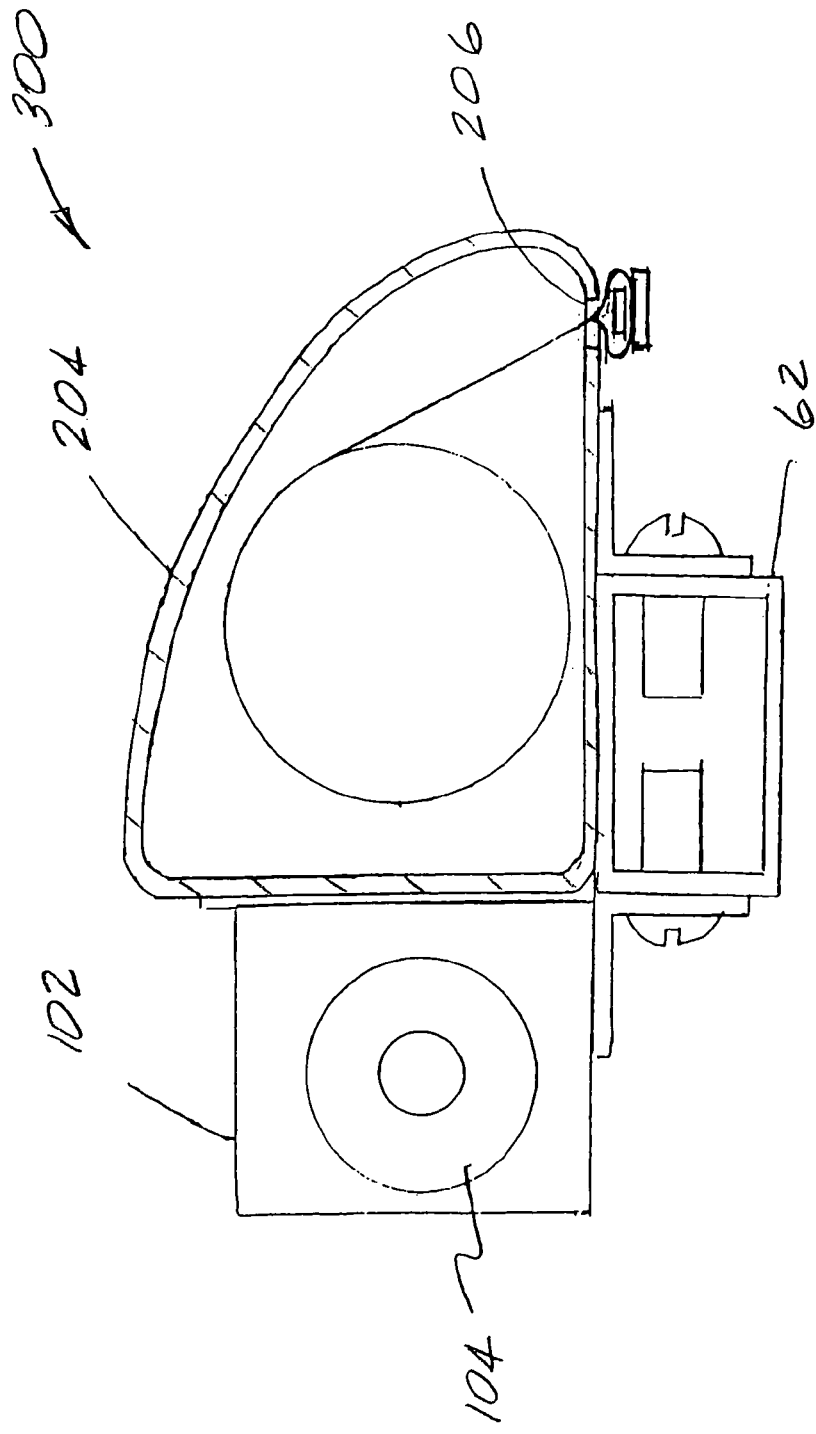
FIG. 11 is a cross-sectional view, similar to FIG. 5, showing a fourth embodiment of the invention which combines the electric motor of FIG. 5 with the housing of FIG. 8.

FIG. 11 shows a fourth embodiment of the invention 300 which combines the electrical motor 102 which has been previously described with the housing 204 of the third embodiment of the invention 200.

Figure 12:
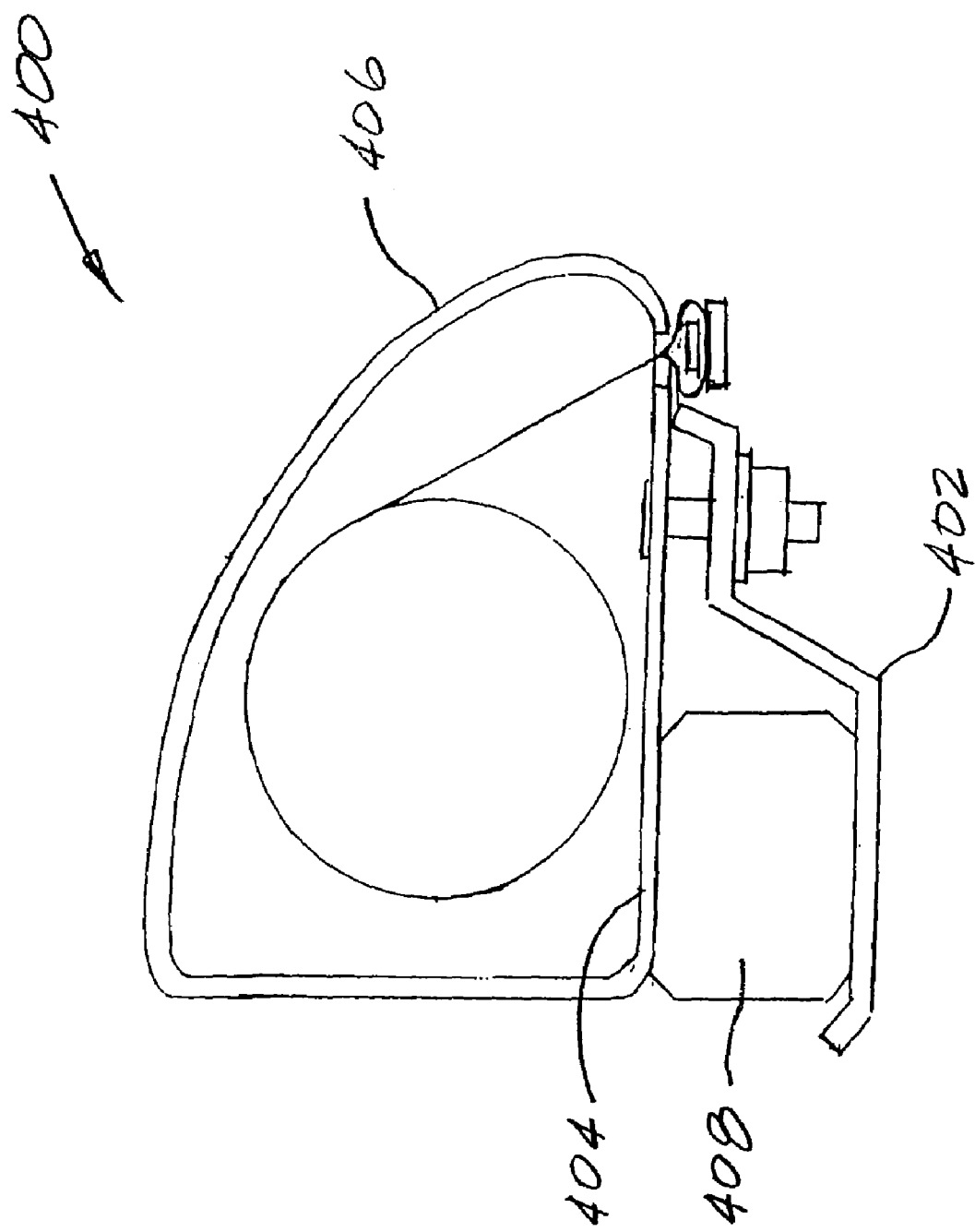
FIG. 12 is a cross-sectional view, similar to FIG. 9, showing a fifth embodiment of the invention which incorporates a clamp mounted on the housing.

FIG. 12 shows a fifth embodiment of the invention 400 which includes a clamp 402 mounted on the horizontal panel 404 of the housing 406. The clamp 402 enables the housing 406 to be attached to a bar 408 which is mounted on the roof of an automobile. The bar 408 may be part of the original equipment of the automobile 46 or it may be part of an aftermarket luggage carrier or ski rack.

Figure 13:
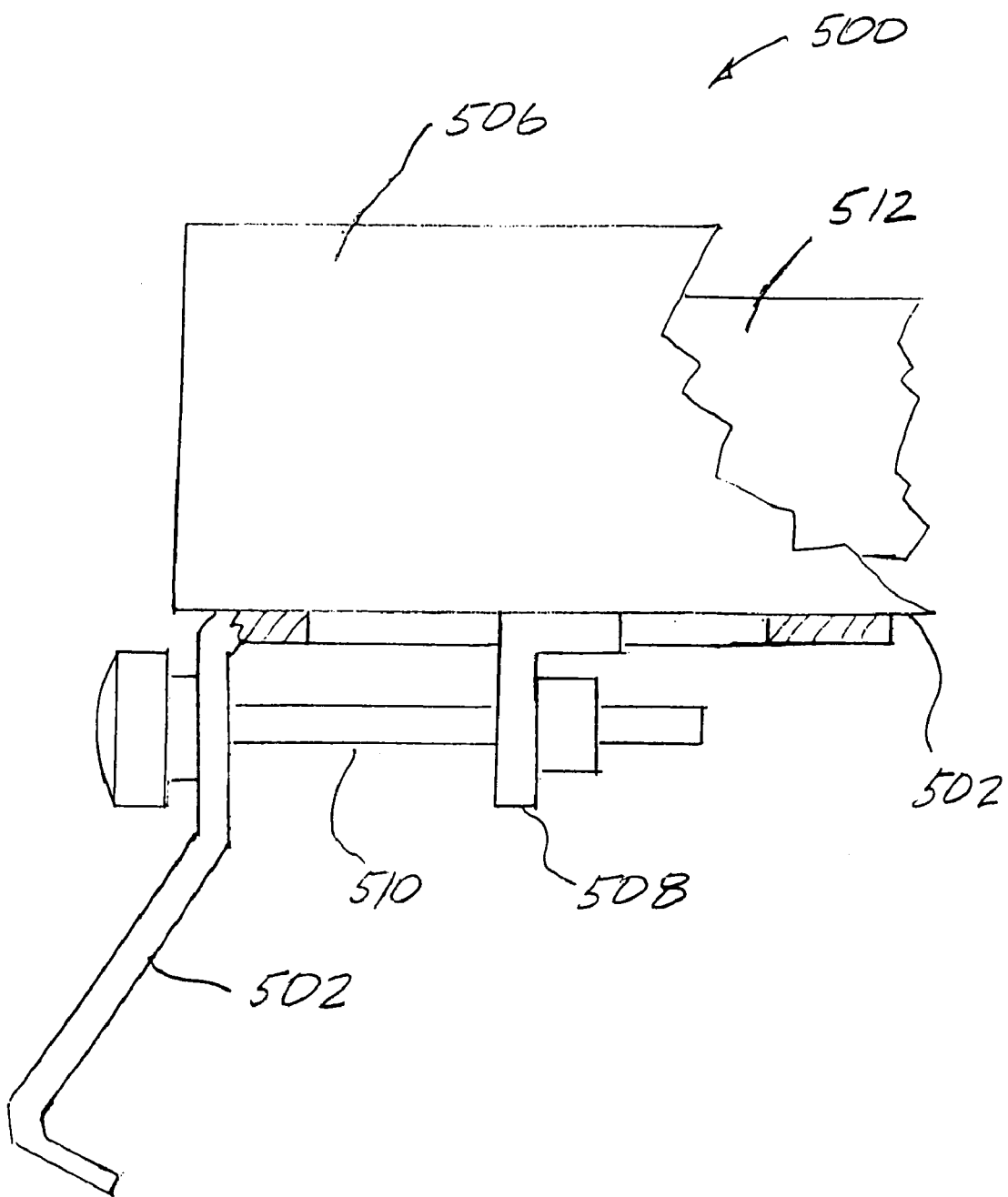
FIG. 13 is a fragmentary cross-sectional view showing a sixth embodiment of the invention which incorporates a clamp for attachment to the roof of an automobile.

FIG. 13 shows a sixth embodiment of the invention 500 which incorporates a sliding clamp 502 which is mounted on the horizontal panel 504 of the housing 506. The clamp 502 enables the housing 506 to be clamped directly to the roof of an automobile without the need for any intermediate structure. The clamp 502 includes a bracket 508 and a clamp screw 510 which is threaded into the bracket 508. The sunshade 512 is mounted in the housing 506 in the manner which has been previously described.

Figure 14:
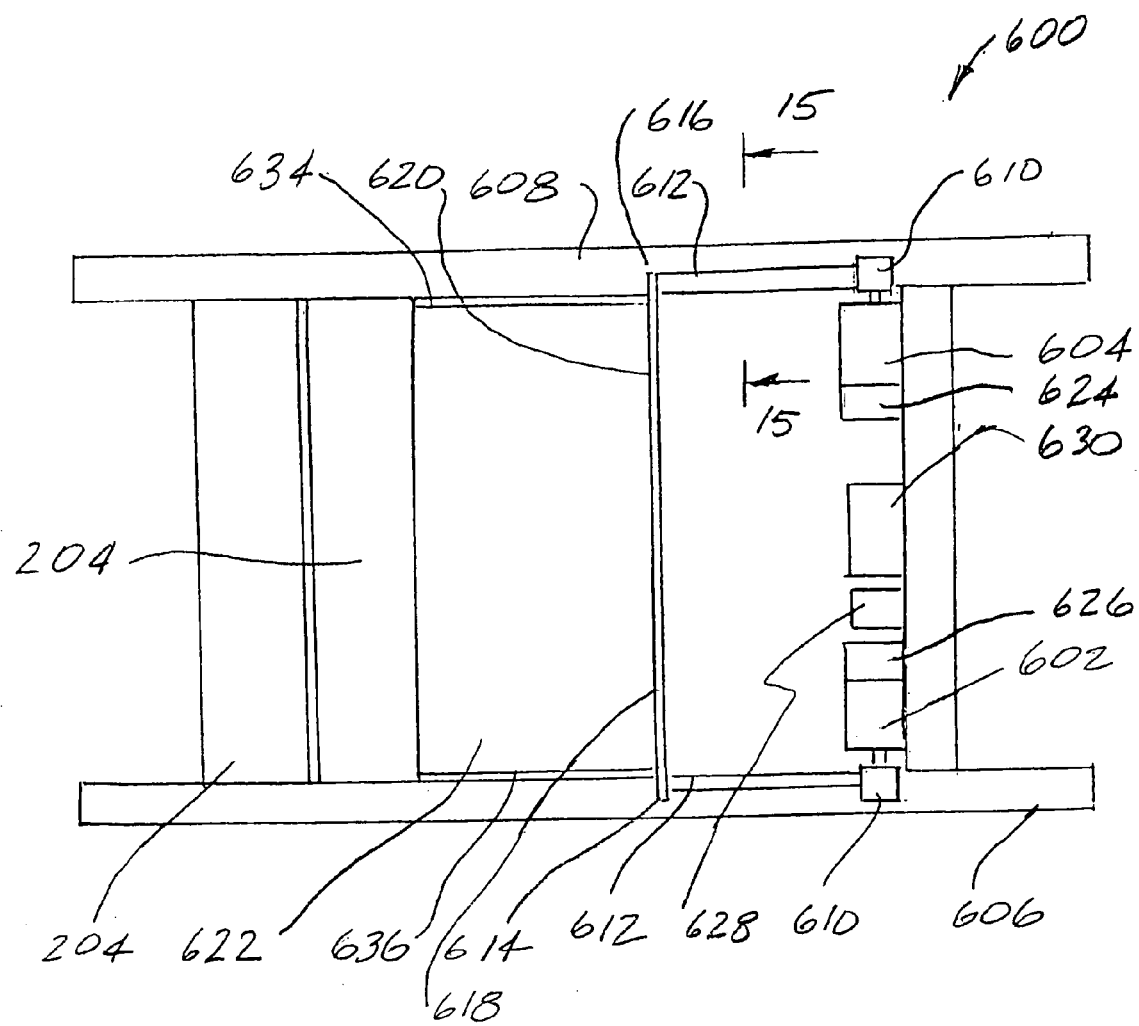
FIG. 14 is a schematic top plan view of a seventh embodiment of the invention which incorporates a part of electric motors.
Figure 15:
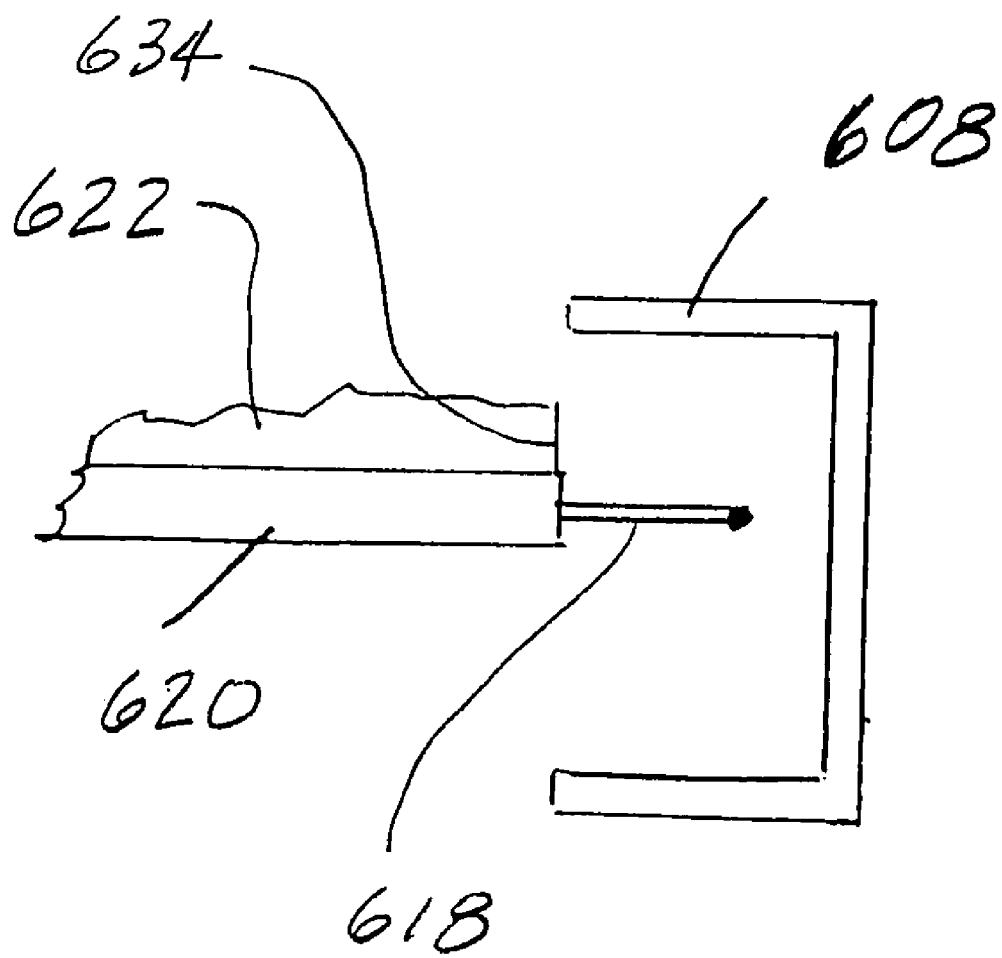
FIG. 15 is a cross-sectional view taken along the line 15—15 of FIG. 14.
Figure 16:
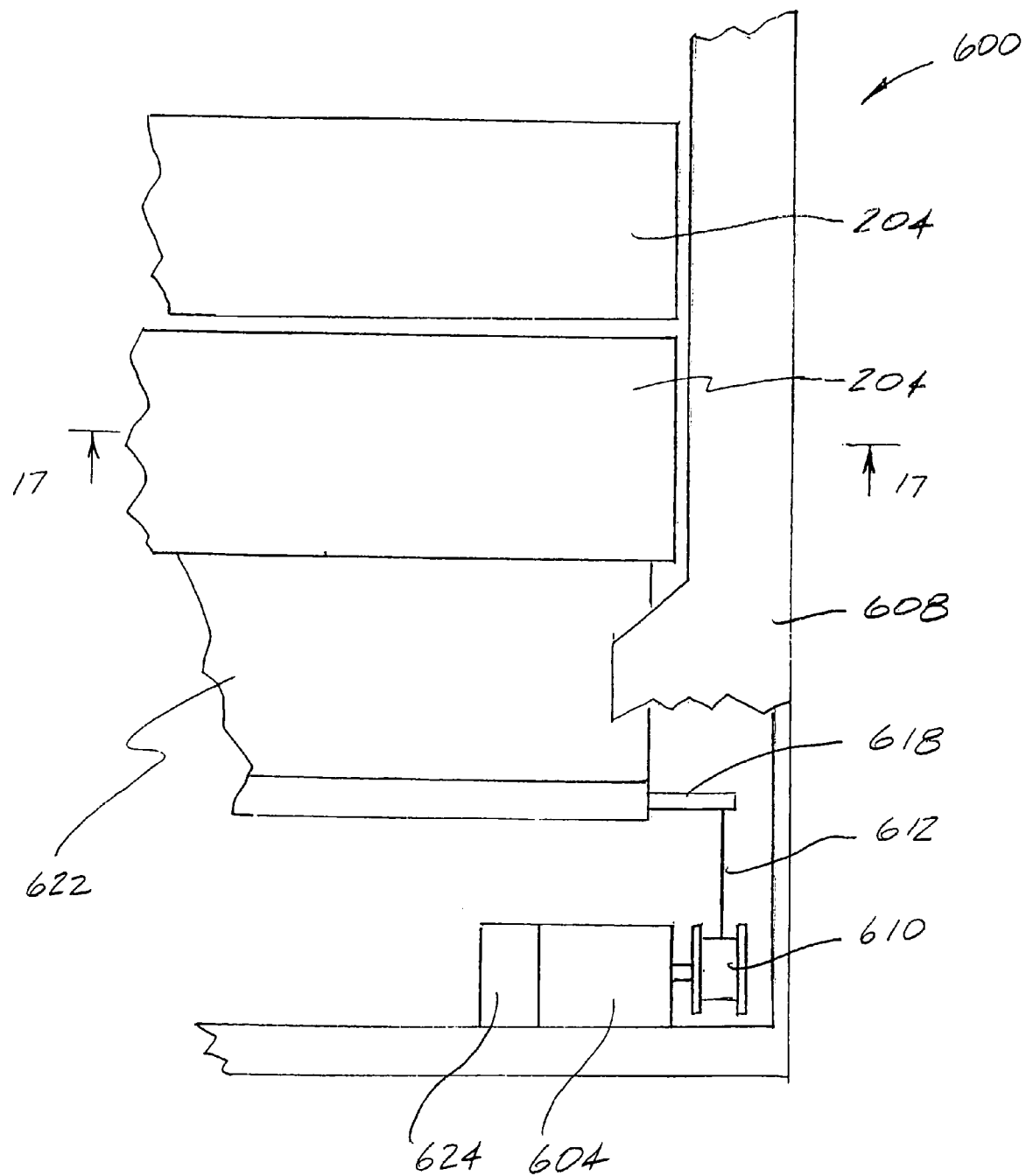
FIG. 16 is a fragmentary top plan view of the embodiment of FIG. 14 with portions shown broken away to reveal details of internal construction.

FIGS. 14–16 show a seventh alternative embodiment of the invention 600 which incorporates a pair of electric motors 602, 604 and a pair of guide rails 606, 608. The electric motors 602, 604 each drive a drum 610 which stores a cord 612. The cords 612 are attached to the ends 614, 616 of a rod 618 which is attached to the end 620 of the roof sunshade 622. The electric motors 602, 604 each incorporate a power-off brake 624, 626 which clamps the motors 602, 604 and prevents rotational motion when the electric power to the motor 602, 604 is off. The brakes 624, 626 thus maintain the position of the roof sunshade 622.

The electric motors 602, 604 are powered by batteries 628 which are maintained in a charged condition by photovoltaic solar cells in a solar panel and charger 630.

In the embodiment of FIGS. 7 and 14–16, the pawl assembly 30 of FIG. 17 has been eliminated and the brake assemblies 624, 626 maintain the position of the roof sunshade 622.

As is shown in FIGS. 14–16, the edges 634, 636 of the roof sunshade 622 move within the constraint established by the guide rails 606, 608.

Figure 22:
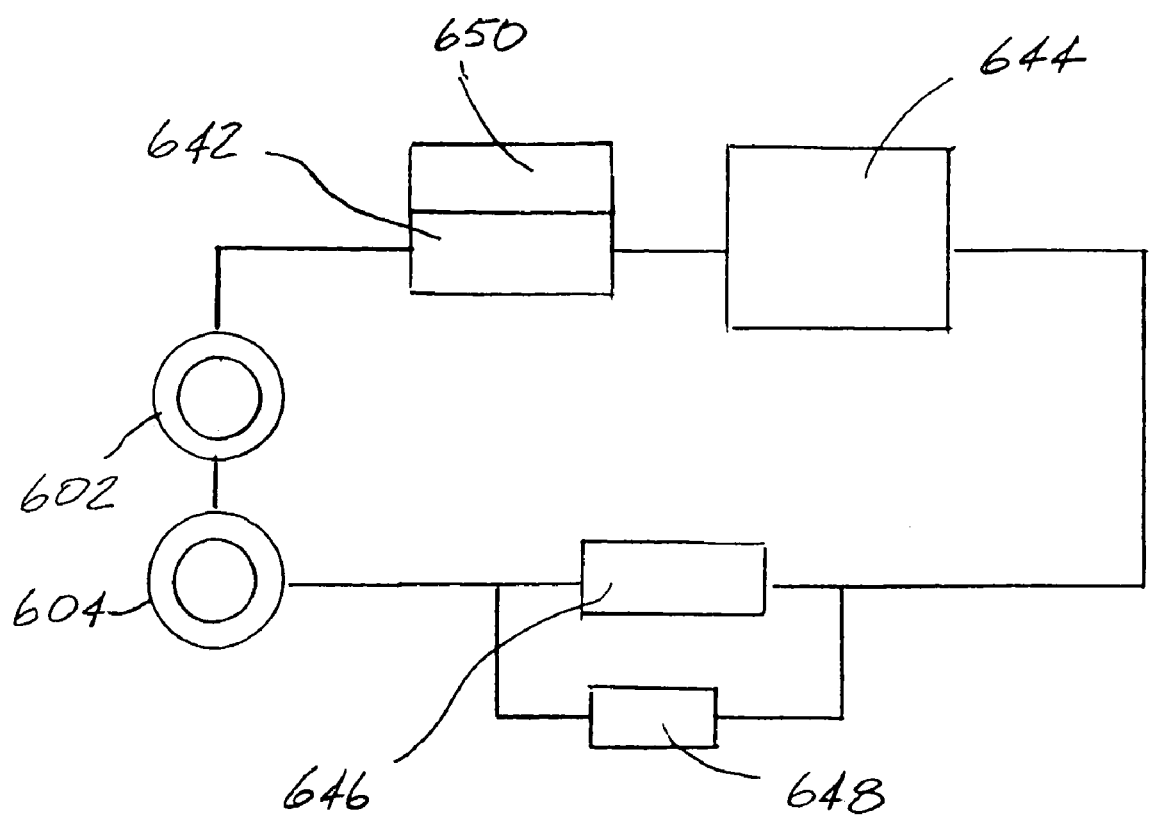
FIG. 22 is a functional block diagram of the electrical components of FIG. 14.

As shown in FIG. 22, the electric motors 602, 604 battery charger 642, photovoltaic solar panel 644, battery 650 and heat sensor 646 form a series circuit. The heat sensor 646 senses the temperature of the roof of the automobile 46 or, alternatively, the heating caused by exposure of the heat sensor 646 to the sun and activates the motors 602, 604 to cover the roof when a pre-selected temperature level is reached. An automobile equipped with the apparatus of the present invention 600 can thus be left unattended and when a pre-selected temperature level is reached, the roof sunshade 622 is automatically deployed to cover the roof The heat sensor 646 includes a switch 648 which functions to activate the heat sensor 646 for automatic operation or de-activate the heat sensor 646 for deployment of the roof sunshade 622 responsive to operation of the switch 648 by an operator.

Figure 18:
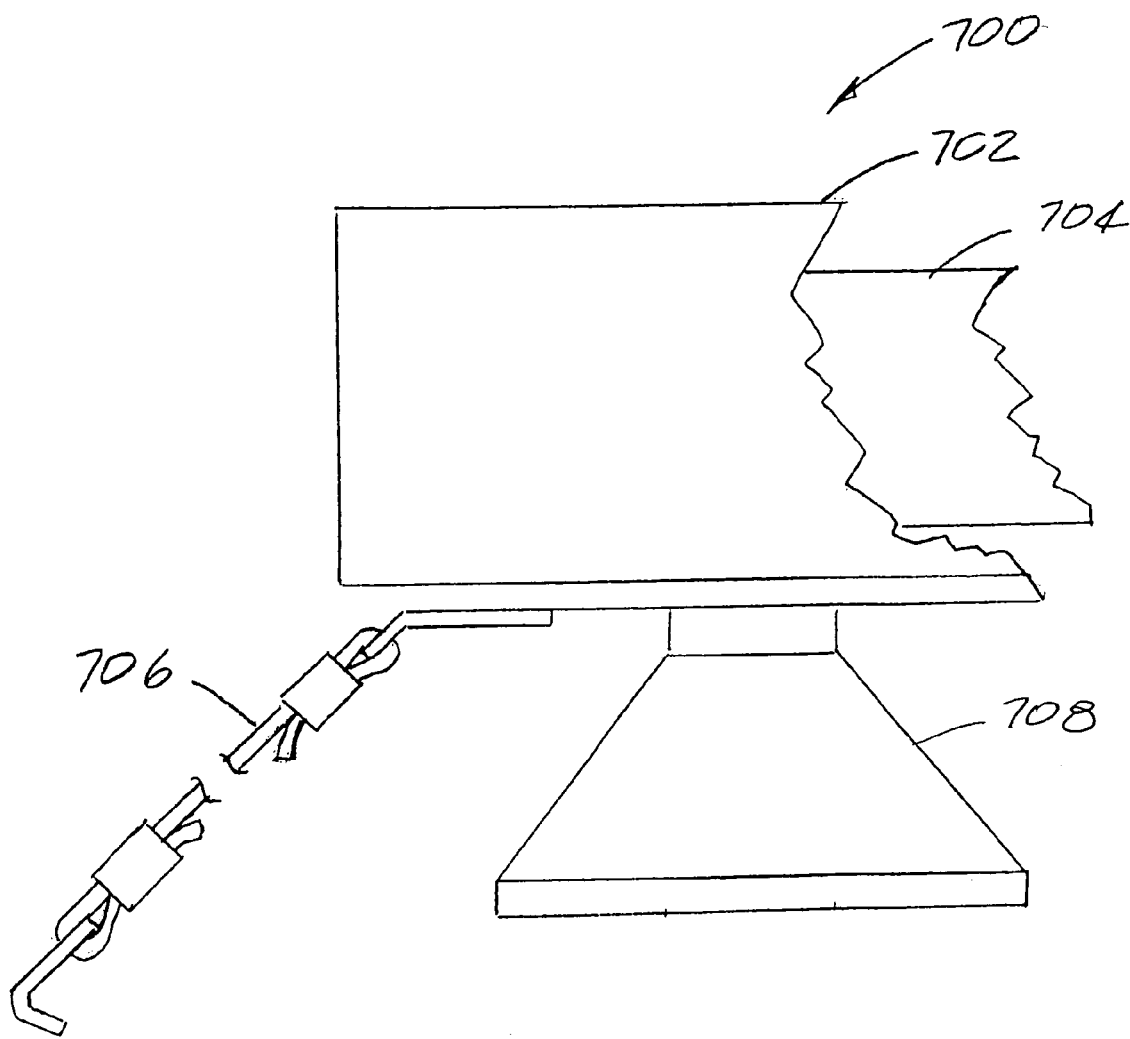
FIG. 18 is a fragmentary elevation view showing an eighth embodiment of the invention which incorporates suction cups and flexible straps for mounting on an automobile.
Figure 19:
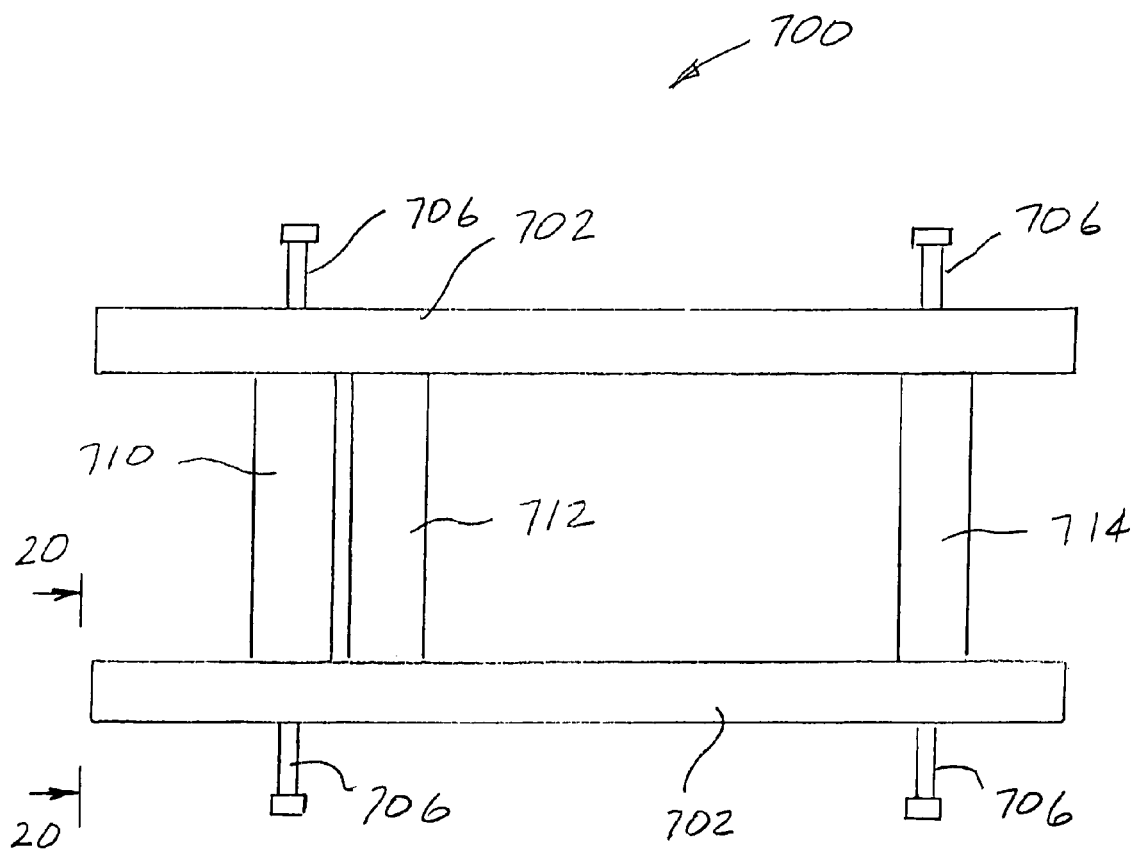
FIG. 19 is a schematic top plan view of the embodiment of FIG. 18.
Figure 20:
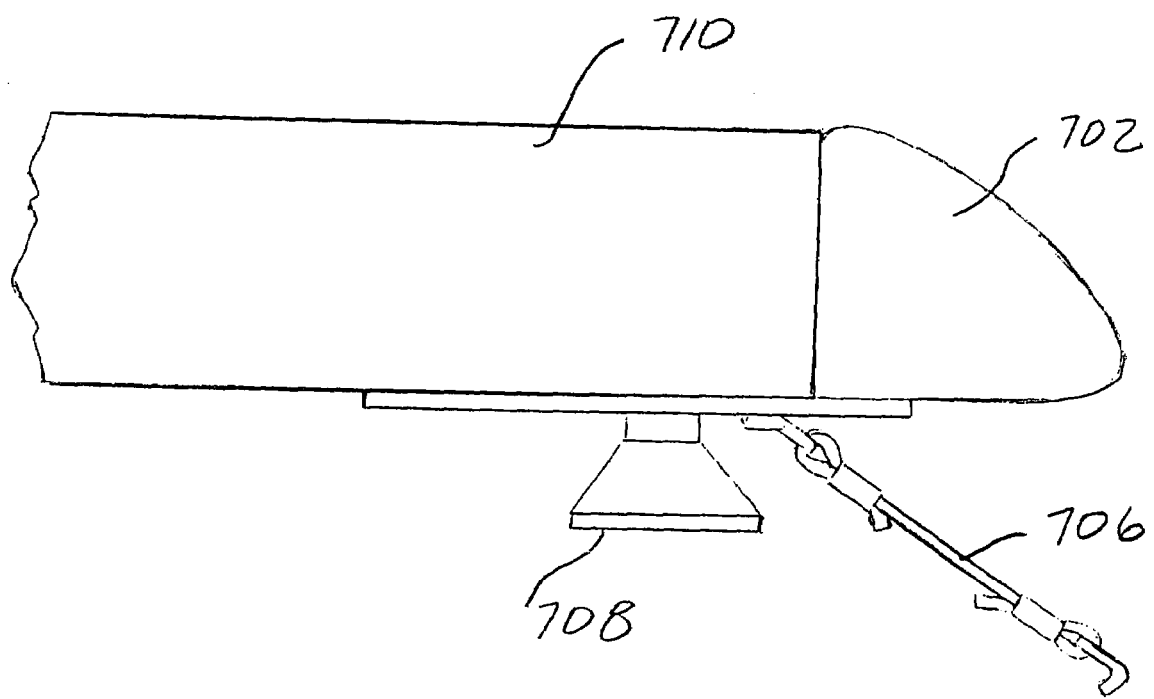
FIG. 20 is a fragmentary elevation view taken along the line 20—20 of FIG. 19.

FIGS. 18–20 show an eighth embodiment of the invention 700 in which the housings 702 which supports the sunshade 704 is attached to the roof of an automobile using flexible straps 706 and suction cups 708. The housings 702 which support sunshades 704 for the side windows support housings 710, 712 and 714 which support sunshades for the front window, roof and rear window, respectively.

Figure 21:
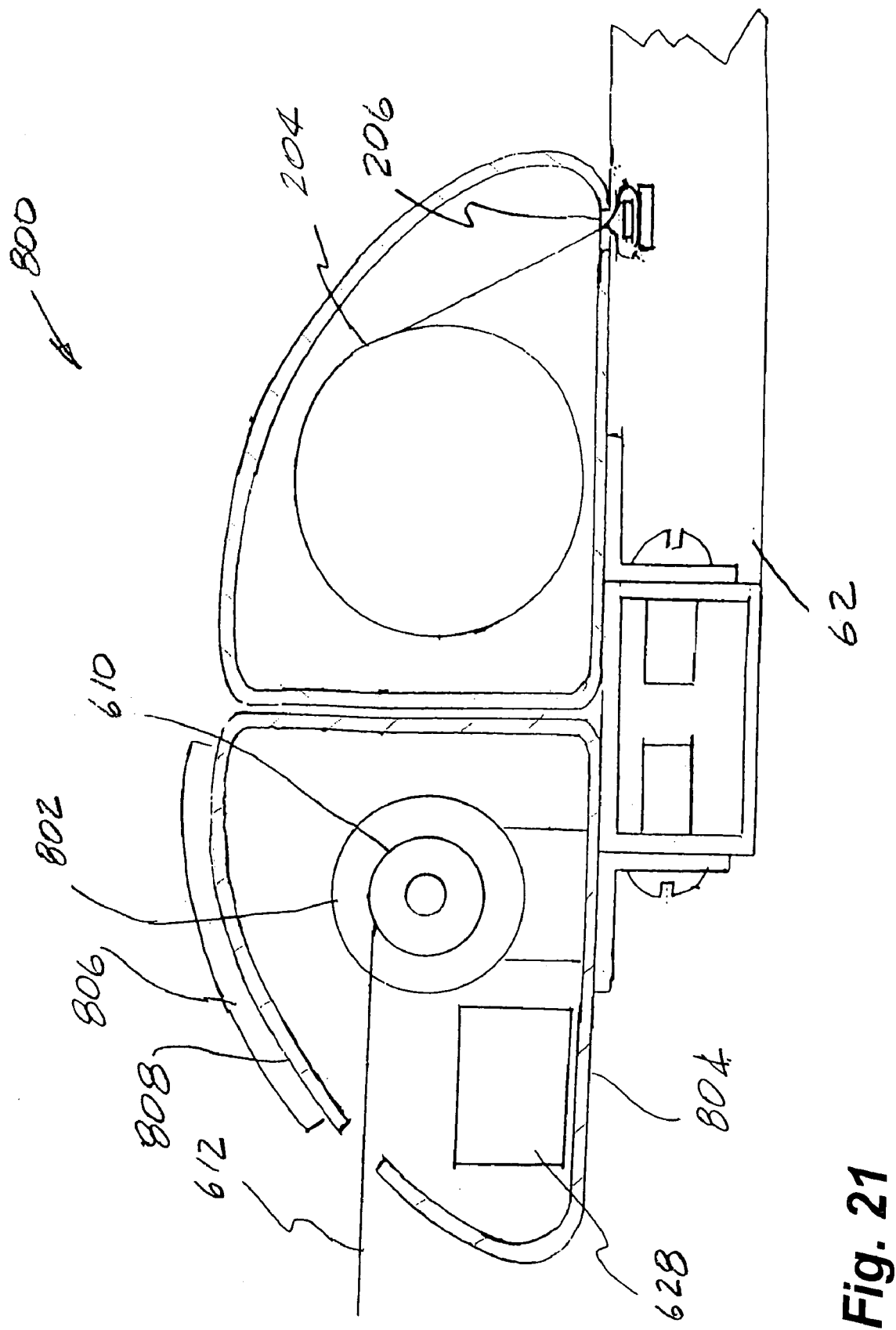
FIG. 21 is a fragmentary cross-sectional view showing a ninth embodiment of the invention.

FIG. 21 shows a ninth embodiment of the invention 800 in which the electric motor 802 is mounted inside the housing 804. The solar panel 806 is mounted on the outside 808 of the housing 804.

The various housings 12, 14, 16, 18, 20 as shown in FIGS. 1–21 form a generally rectangular configuration when mounted on an automobile roof as shown in FIG. 1. The combination of flat 48, 50 and curved panels 52 on each of the housings 12, 14, 16, 18, 20 results in a relatively light weight but rigid structure. When the sunshades 22, 32, 34, 36 are stored in the housings, the housings 12, 14, 16, 18, 20 can be used as a luggage carrier to store and transport various items which have been placed on the roof of the automobile 46 and tied to the housings 12, 14, 16, 18, 20.

Brackets 900, 902, 904, 906, 908, 910 may be provided as shown in FIG. 7 to connect adjacent housings to add rigidity to the structure.

Figure 23:
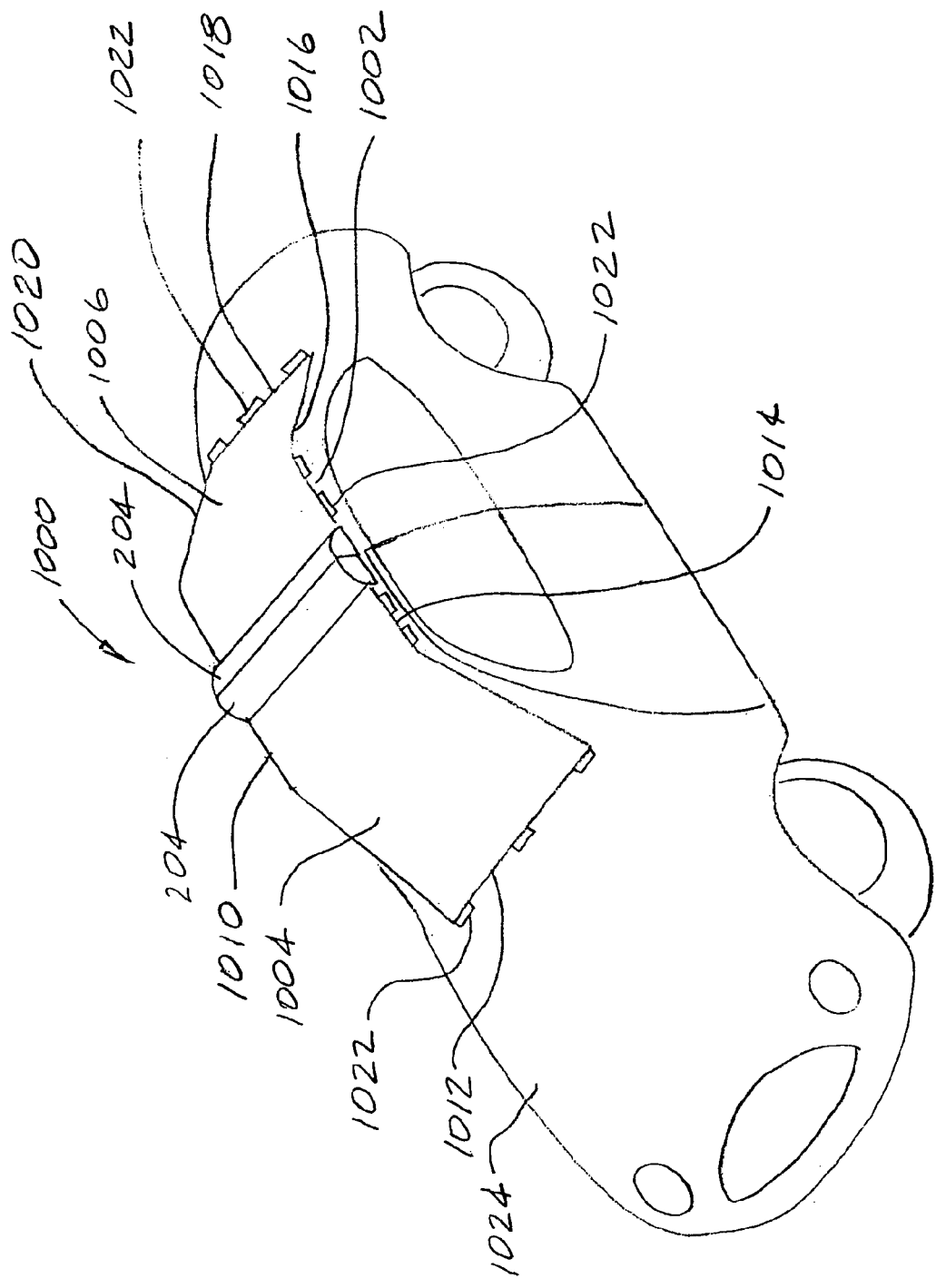
FIG. 23 is an overall perspective view similar to FIG. 1 showing a ninth embodiment of the invention.
Figure 24:
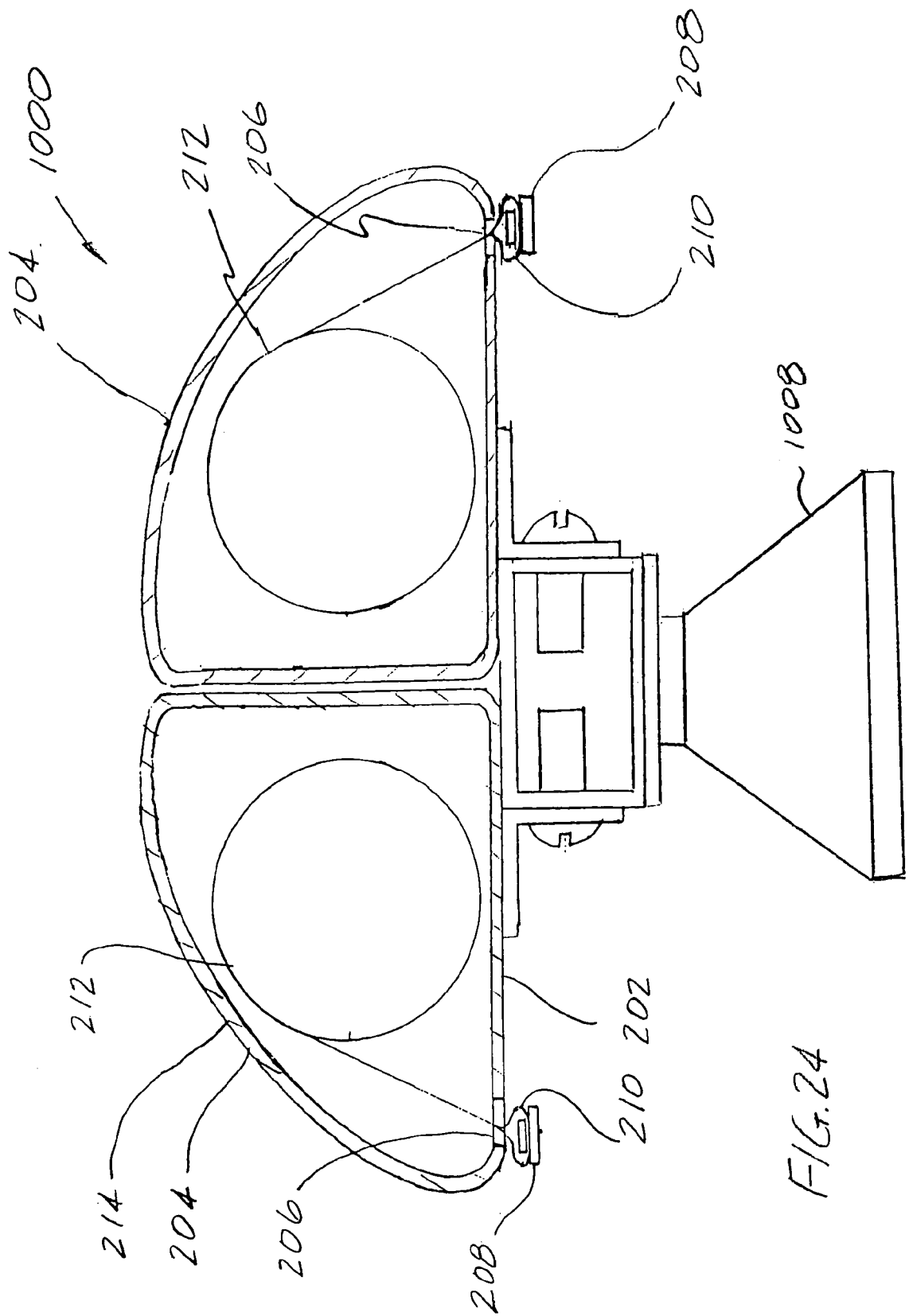
FIG. 24 is a cross-sectional view taken along the line 24—24 of FIG. 23.

FIGS. 23 and 24 show a tenth embodiment of the invention 1000 in which a twin housing generally similar to the housings shown in FIG. 8 is mounted on the roof 1002 of an automobile. The housings 204 may be mounted near the front of the automobile roof near the center of the automobile roof, as shown in FIG. 23, or near the rear of the automobile roof. The flexible sunshades 1002, 1006 are proportioned so that when the housings 204 are mounted near the front of the automobile roof 1002, the flexible sunshade 1004 can cover the front windshield and the flexible sunshade 1006 can cover both the roof and the rear windshield.

When the housings 204 are mounted near the rear of the automobile roof 1002, the flexible sunshade 1004 can cover the roof and the front windshield and the flexible sunshade 1006 can cover the rear windshield.

When the housings 204 are mounted near the center of the roof, the flexible sunshades 1004, 1006 each cover a portion of the roof 100 with the flexible sunshade 1004 covering the front windshield and the flexible sunshade 1006 covering the rear windshield.

The attachment of housings to the automobile roof may be in accordance with any one of the constructions, including suction cups and flexible straps described above. An example of such construction is the suction cup 1008. The edges 1010, 1012, 1014, 1016, 1018, 1020, the flexible sunshades 1004, 1006 each have a plurality of magnets 1022 mounted thereon. The magnets 1022 enable the flexible sunshades 1004, 1006 to be attached to the roof and body of the automobile 1024 or to a conventional luggage carrier rails which may be mounted on the roof of the automobile 1024.

The foregoing specific embodiments of the present invention asset forth in the specification herein are for illustrative purposes only. Various deviations and modifications may be made within the spirit and scope of this invention without departing from the main theme thereof.

What is claimed is:

1. An automobile sunshade of an automobile having a roof, a body front windshield, a rear windshield, and a pair of side windows, said automobile sunshade comprising:
   a first housing;
   a first roller mounted in said first housing;
   a first flexible sunshade having a first position rolled onto said first roller and a second position unrolled from said first roller, with said first flexible sunshade having an outer edge;
   first attachment means comprising a suction cup for attachment of said first housing to the roof of an automobile, a second attachment means comprising magnets for attachment of said outer edge of said first flexible sunshade to the body of an automobile;
   an electric motor means for extending said first flexible sunshade from said first position to said second position to cover said roof;
   battery means mounted within said first housing for powering said electric motor means; and
   solar panel means mounted on an outside surface of said at least one curved pane for recharging said rechargeable battery means.

2. The automobile sunshade as claimed in claim 1 in which said first housing comprises at least one curved panel.

3. The automobile sunshade as claimed in claim 1 in which said first housing comprises an aperture portion for passage of said first sunshade.

4. The automobile sunshade as claimed in claim 1 further comprising:
 a third housing, and
 a fourth housing, with said third and said fourth housings each substantially identical to said first housing and containing a third and a fourth flexible sunshade respectively, with said third housing disposed parallel to and spaced away from said fourth housing and with said third and said fourth housings disposed in a longitudinal orientation relative to said roof of said automobile, with said third and said fourth sunshades disposed to cover said side windows in said unrolled position.

5. The automobile sunshade as claimed in claim 1 wherein said second housing is disposed parallel to and adjacent to said first housing.

\* \* \* \* \*